April 22, 1941.         J. M. NICKELSEN         2,239,112
SHOCK ABSORBER
Filed April 18, 1938

INVENTOR.
John M. Nickelsen
BY Whitemore Hulbert & Belknap
ATTORNEYS

Patented Apr. 22, 1941

2,239,112

UNITED STATES PATENT OFFICE 2,239,112

SHOCK ABSORBER

John M. Nickelsen, Ann Arbor, Mich., assignor to Monroe Auto Equipment Company, Monroe, Mich., a corporation of Michigan Application April 18, 1938, Serial No. 202,737

11 Claims. (Cl. 188—88)

This invention relates generally to shock absorbers and refers more particularly to hydraulic shock absorbers of the direct acting type.

One of the principal objects of this invention is to improve generally shock absorbers of the direct acting type by simplifying the construction of the number of parts involved and by reducing the number of these parts to a minimum. In accordance with this invention, the number of separable parts of the shock absorber is appreciably reduced by providing a body section having a pressure cylinder and a reserve chamber of one piece construction. As a result, the cost of manufacture is not only reduced but, in addition, assembly is expedited and simplified.

A further advantageous feature of this invention consists in the provision of a shock absorber of the character set forth in the preceding paragraph which, aside from embodying a construction capable of effectively controlling the sprung weight of a vehicle in both directions of vertical movement thereof, is durable in construction and will afford highly satisfactory operation over a long period of use.

The foregoing, as well as other objects, will be made more apparent as this description proceeds, especially when considered in connection with the accompanying drawing, wherein.

Figure 1:
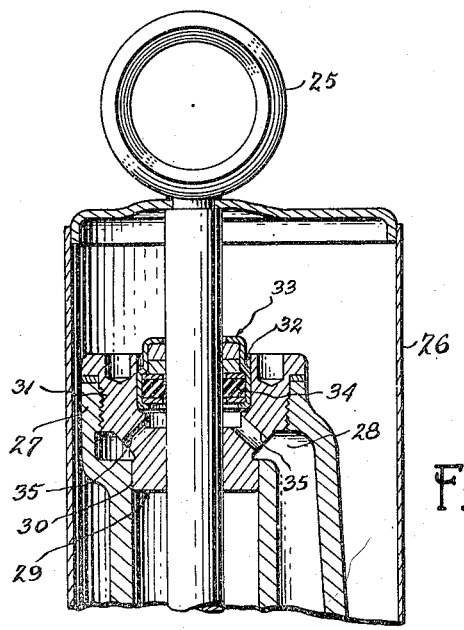
Figure 1 is a longitudinal sectional view through a shock absorber constructed in accordance with this invention.
Figure 2:
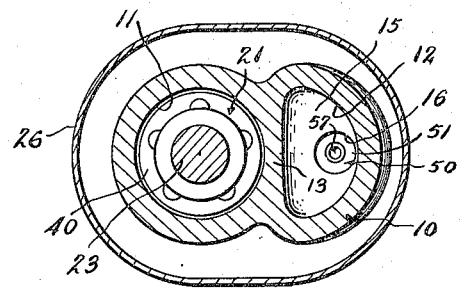
Figure 2 is a cross sectional view taken substantially on the plane indicated by the line 2—2 of Figure 1.

Referring now more in detail to the drawing, it will be noted that there is illustrated in Figure 1 a hydraulic shock absorber of the direct acting type having a body 10 of one piece construction and comprising a pressure cylinder 11 and a reserve chamber 12. In the present instance, the reserve chamber 12 extends along one side of the pressure cylinder and the two are cast in one piece to provide a unitary construction. In the specific embodiment of the invention shown, the exposed walls of the body are cast thicker than the common intermediate wall 13 in order to avoid damage due to stones striking these walls and thereby eliminate the necessity of employing a stone shield.

The lower end of the pressure cylinder 11 is provided with an extension 14 having an inner wall 15 forming the bottom wall of the reserve chamber 12 and provided with a port 16 therethrough establishing communication between the interior of the reserve chamber and the bottom of the pressure cylinder. The outer wall 17 of the extension is provided with an opening 18 therethrough in alignment with the port 16 and this opening is normally closed by a plug 19 threaded within the opening. The opening 18 forms a filler opening through which the hydraulic medium is admitted to both the pressure cylinder and reserve chamber. The pressure cylinder is filled with the fluid and the reserve chamber is filled up to the level indicated by the broken line A in Figure 1. In addition, the outer wall 17 is cast with a portion 20 adapted for connection with a part of the unsprung weight of the vehicle.

In the present instance, the plug 19 also forms a mounting for the valve assembly 50 which controls communication between the reserve chamber 12 and lower end of the pressure cylinder through the port 16. The valve 50 is provided with a head portion 51 normally maintained into engagement with an annular seat 52 surrounding the lower end of the annular passage 16 and having a stem 53 slidably mounted in a recess 54 formed in the plug 19 for the filler opening 18. The head is normally urged into engagement with the seat 52 by means of a spring 55 surrounding the stem 53 with the lower end abutting the plug and with the upper end engaging the underside of the head. Thus, it will be seen that the valve and filler plug 19 form an assembly capable of being installed in the shock absorber as a unit. A bleed passage 57 is formed in the valve 50 and provides a restricted permanent communication between the lower end of the pressure chamber and the corresponding end of the reserve chamber. The function of this bleed passage in the operation of the shock absorber will be more fully hereinafter set forth.

A piston 21 is reciprocably mounted in the pressure cylinder and is secured to a reduced portion 22 at the lower end of a connecting rod 23 by means of a nut 24. The connecting rod extends through the open upper end of the pressure cylinder and is adapted to be connected to the sprung weight by the portion 25. A dust shield 26 is secured to the connecting rod 23 adjacent the portion 25 and is adapted to telescope the upper end portion of the shock absorber to protect the latter end from accumulation of foreign matter thereon.

Upon reference to Figure 1, it will be noted that the pressure cylinder and reserve chamber comprise a casing 27 having an open end extending beyond the cylinder and chamber in concentric relation to the pressure cylinder. The casing 27 opens into the open end of the reserve chamber through the medium of a passage 28 and the open end of the reserve chamber is closed by a bushing 29 having an enlarged threaded portion 31 threadedly engageable with the open end of the casing 27. It will also be noted that the bushing 29 has a reduced portion 30 sleeved in the upper end of the pressure cylinder and formed with a central opening therethrough for the passage of the connecting rod 23. As shown in Figure 1, the enlarged portion 31 of the bushing is counterbored to provide a recess 32 around the connecting rod and a seal 33 is secured in the recess. The seal 33 is provided with a rubber washer 34 surrounding the connecting rod 23 in frictional engagement therewith and acting as a wiper to remove any fluid adhering to the connecting rod. Any fluid wiped off the connecting rod is discharged into the casing 27 through the passages 35 formed in the bushing 29 and is returned to the reserve chamber 12 through the opening 28.

Figure 3:
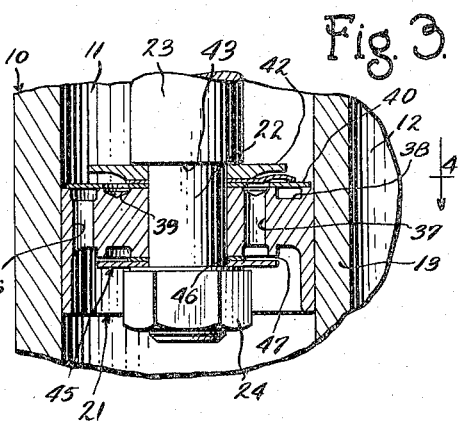
Figure 3 is an enlarged sectional view through the piston of the shock absorber.
Figure 4:
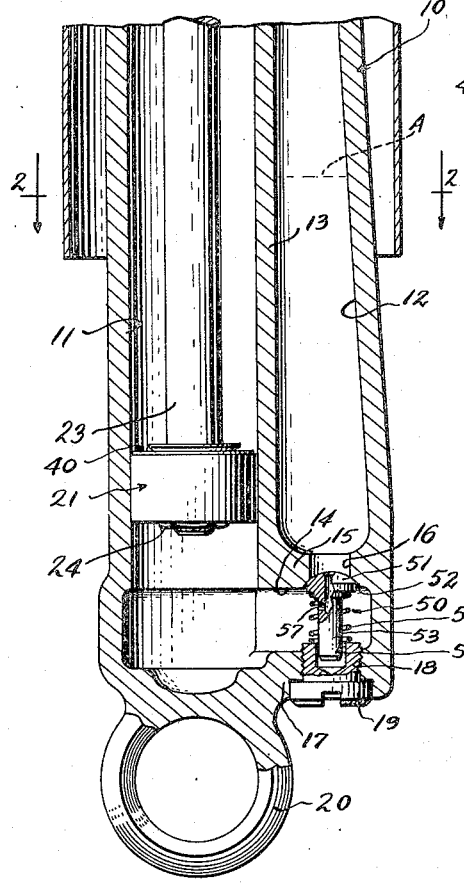
Figure 4 is a sectional view taken substantially on the plane indicated by the line 4—4 of Figure 3.

In the present instance, the fluid in the pressure cylinder 11 is displaced by the piston 21 and in order to permit this displacement of the fluid, the piston is provided with two series of ports therethrough, designated generally herein by the reference characters 36 and 37. Upon reference to Figure 3, the passage of fluid through the ports in the piston is controlled by valve means so arranged that when the piston is, in effect, moved in a direction toward the upper end of the cylinder, fluid in the cylinder above the piston is permitted to flow downwardly through the inner series of ports 37 to the portion of the pressure cylinder below the piston. On the other hand, when the piston 21 is moved, in effect, in a downward direction relative to the pressure cylinder, fluid in the latter below the piston is transferred through the outer series of ports 36 to the portion of the pressure cylinder above the piston. Also, the valve means is such as to differentially control the flow of fluid to the piston in opposite directions. As will be presently set forth, when the piston is moved downwardly in the pressure cylinder, relatively free flow of fluid is permitted through the piston and when the piston is moved upwardly in the pressure cylinder, the flow of fluid through the piston is restricted to a greater extent.

In detail, the upper ends of the two series of passages respectively discharge into non-communicating annular recesses 38 and 39 formed in the upper face of the piston. The recess 38 communicating with the upper ends of the ports 36 through the piston is normally closed by a resilient disc valve 40 seated upon the top surface of the piston and having slots 41 therethrough communicating with the recess 39 in a manner such that fluid is permitted to flow into the ports 37 from the portion of the pressure cylinder above the piston. The disc valve 40 is secured at its center on the reduced portion 22 of the connecting rod and the central portion is maintained into clamping engagement with the piston by means of a washer 42 clamped between the disc valve 40 and the shoulder 43 formed by the reduced portion 22 of the connecting rod. It follows from the above that fluid flowing upwardly through the passages 36 upon downward movement of the piston is required to flex the peripheral portion of the disc valve 40 in order to pass into the portion of the pressure cylinder above the piston.

The disc valve 40, however, permits relatively free flow of fluid through the piston from the portion of the pressure cylinder below the piston to the portion of the pressure cylinder above the piston and resistance to this movement of the shock absorber is secured mainly by the restricted bleed passage 57 through the valve 50 controlling communication between the lower ends of the pressure cylinder and the reserve chamber. In this connection, it will be noted that the cross sectional area of the available space for fluid in the pressure cylinder 21 above the piston is less than the cross sectional area below the piston by an amount equal to the displacement, or cross sectional area of the piston rod 23. In other words, the space in the pressure cylinder above the piston is unable to accommodate all of the fluid in the pressure cylinder below the piston and this excess fluid is discharged into the reserve chamber 12 through the restricted bleed passage 57 through the valve 50. The passage 57 is restricted to such an extent as to substantially retard downward movement of the piston, and the pressure characteristics of the shock absorber may be varied by changing the cross sectional area of this passage.

When the piston is moved in an upward direction in the pressure cylinder, the capacity of the pressure cylinder below the piston increases to a greater extent than the capacity of the portion of the pressure cylinder above the piston diminishes by an amount equal to the displacement of the connecting rod 23. As a result, the pressure in the cylinder below the piston falls below the pressure in the reserve chamber and the valve 50 is moved away from the annular seat 52 against the action of the spring 55 to replenish the pressure cylinder with fluid from the reserve chamber.

Movement of the piston upwardly in the pressure cylinder is retarded by a relatively strong spring disc valve member 45 mounted on the lower end of the reduced portion 22 of the connecting rod and having the central part clamped against the underside of the piston by means of the nut 24. The spring disc valve 45 is stronger than the disc valve 40 to provide the required restriction in this direction of movement of the piston. If desired, a permanent bleed or by-pass may be provided around the disc valve 45 to permit controlling the pressure characteristics of the shock absorber when the piston is moved in an upward direction in the pressure cylinder. In accordance with the present invention, the bleed or by-pass is effected by interposing a washer 46 of predetermined thickness between the lower surface of the piston and the spring disc valve 45 to provide a limited passage 47 through which fluid may freely flow from the portion of the pressure cylinder above the piston to the portion of the pressure cylinder below the piston when the latter is moved in an upward direction. It follows, of course, that the quantity of fluid medium by-passed will depend upon the amount of clearance and the latter, in turn, depends upon the thickness of the washer 46. Thus, by employing washers having different thicknesses, the quantity of fluid medium by-passed may be varied and, as a consequence, the pressure characteristics of the shock absorber changed to conform to the specifications required.

Thus, from the foregoing, it will be observed that I have provided a highly efficient direct acting shock absorber composed of a relatively few simple parts capable of being readily manufactured and assembled. In addition, it will be noted that the shock absorber is durable in construction and will operate effectively over a long period of use.

What I claim as my invention is:

1. In a direct acting shock absorber, a pressure cylinder and a reserve chamber cast in one piece with the ends at one end of the shock absorber open, a closure for said open ends having provision for closing said ends against communication with each other, a lateral extension at the opposite end of the reserve chamber having an inner wall forming the opposite end wall of the reserve chamber, a port through said inner wall establishing communication between the pressure cylinder and reserve chamber, a filler plug secured in a filler opening formed in the outer wall of the extension, a valve member slidably supported on the filler plug and having a portion engageable with a valve seat surrounding said port, yieldable means also carried by the plug for urging the portion aforesaid of the valve member against the seat, and a bleed opening through the valve member establishing communication between the reserve chamber and cylinder.

2. In a direct acting shock absorber, a pressure cylinder and a reserve chamber cast in one piece with one wall of the pressure cylinder forming one exterior wall of the shock absorber, one end of the pressure cylinder being open and the end of the reserve chamber adjacent the end aforesaid of the pressure cylinder also being open, said pressure cylinder and reserve chamber comprising a casing having an open end extending beyond the open end of the pressure cylinder and reserve chamber and disposed concentric with the pressure cylinder, a closure having a portion fitted within the open end of the casing to close said reserve chamber and having a reduced portion fitted within the open end of the pressure cylinder closing communication between the open end of the pressure cylinder and the open end of the reserve chamber, means including a port establishing communication between the opposite end of the pressure cylinder and the reserve chamber, a piston reciprocably mounted in the cylinder, and means providing for a restricted flow of fluid through the piston in opposite directions.

3. In a direct acting shock absorber, a pressure cylinder open at one end, a reserve chamber having an open end adjacent the open end aforesaid of the cylinder, said pressure cylinder and reserve chamber comprising a casing having an open end extending beyond the open ends of the pressure cylinder and reserve chamber and disposed concentric with the pressure cylinder, a closure having a portion threaded in the open end of the casing to close the reserve chamber and having another portion fitted within the open end of the pressure cylinder closing communication between the open end of the pressure cylinder and the open end of the reserve chamber, a lateral extension at the opposite end of the pressure cylinder provided with an inner wall forming the adjacent end wall of the reserve chamber, a port through said inner wall establishing communication between the reserve chamber and extension of the pressure cylinder, a filler opening through the outer wall of the extension, a plug for closing the filler opening, and valve means carried by the plug and effective to control the flow of fluid through said port.

4. In a direct acting shock absorber, a pressure cylinder and a reserve chamber cast in one piece with the reserve chamber extending in the direction of length of the pressure cylinder, one end of the cylinder and the adjacent end of the reserve chamber being open, said pressure cylinder and reserve chamber comprising a casing having an open end extending beyond the open ends of the pressure cylinder and reserve chamber and disposed concentric with the pressure cylinder, a closure having spaced portions respectively closing the open end of the casing and the open end of the pressure cylinder, a piston reciprocably mounted in the pressure cylinder, and means establishing communication between the opposite ends of the cylinder and reserve chamber including a valve coacting with the piston to control the flow of fluid between the reserve chamber and cylinder.

5. In a direct acting shock absorber, a pressure cylinder and a reserve chamber cast in one piece with the reserve chamber extending in the direction of length of the cylinder, one end of the cylinder and the adjacent end of the reserve chamber being open, said pressure cylinder and reserve chamber comprising a casing having an open end extending beyond the open ends of the pressure cylinder and reserve chamber and disposed concentric with the pressure cylinder, a closure having a portion closing the open end of the casing and the open end of the reserve chamber and having another portion concentric with the portion aforesaid engageable in the open end of the pressure cylinder for closing the latter end, the opposite end of the reserve chamber being closed by a wall integrally connecting the side walls of the chamber with the adjacent walls of the cylinder and having a port therethrough communicating with the cylinder through an extension projecting laterally from the adjacent end of the cylinder, a piston reciprocably mounted in the pressure cylinder, and valve means coacting with the piston to control the flow of fluid through said port.

6. In a direct acting shock absorber, a pressure cylinder and a reserve chamber cast in one piece with the reserve chamber extending in the direction of length of the cylinder, one end of the cylinder and the adjacent end of the reserve chamber being open, said pressure cylinder and reserve chamber comprising a casing having an open end extending beyond the open ends of the pressure cylinder and reserve chamber and disposed concentric with the pressure cylinder, a closure having a portion threaded in the open end of the casing for closing the latter and having a portion concentric with the portion aforesaid extending into the open end of the pressure cylinder for closing the latter, the opposite end of the reserve chamber being closed by a wall integrally connecting the side walls of the chamber with the adjacent walls of the cylinder and having a port therethrough communicating with the cylinder through an extension projecting laterally from the adjacent end of the cylinder, a filler plug secured in a filler opening formed in the outer wall of the extension opposite said port, and a valve member slidably supported by the plug and controlling the flow of fluid through said port.

7. In a direct acting shock absorber, a pressure cylinder and a reserve chamber cast in one piece with the reserve chamber extending in the direction of length of the cylinder, one end of the cylinder and the adjacent end of the reserve chamber being open, a closure having spaced portions respectively closing said open ends, means including a port establishing communication between the opposite ends of the pressure cylinder and reserve chamber, a piston reciprocably mounted in the cylinder, means providing for relatively free flow of fluid through the piston in one direction of movement of the piston in the cylinder and providing for a more restricted flow of fluid through the piston upon movement of the latter in the opposite direction, valve means differentially controlling the flow of fluid through the port aforesaid, said valve means comprising a member normally urged into seating engagement with said port and movable away from the port upon movement of the piston in the second named direction to provide relatively free flow of fluid from the reserve chamber to the pressure cylinder, and a restricted passage through said member providing for a more restricted flow of fluid from the cylinder into the reserve chamber upon movement of the piston in the first named direction.

8. In a direct acting shock absorber, a pressure cylinder and a reserve chamber cast in one piece with the reserve chamber extending in the direction of length of the cylinder, one end of the cylinder and the adjacent end of the reserve chamber being open, a closure having spaced portions respectively closing said open ends against communication with each other, means including a port establishing communication between the opposite ends of the pressure cylinder and reserve chamber, a filler plug normally closing a filler opening communicating with the pressure cylinder, valve means assembled as a unit with the filler plug and effective to control the flow of fluid through said port, said valve means comprising a member slidably supported on the filler plug and having a portion engageable with a seat surrounding the port to close the latter, yieldable means normally urging the member to a position wherein the port is closed thereby, and a restricted passage through the valve member establishing communication between the pressure cylinder and reserve chamber.

9. In a direct acting shock absorber, a pressure cylinder and a reserve chamber cast in one piece with the reserve chamber extending in the direction of length of the cylinder, one end of the cylinder and the adjacent end of the reserve chamber being open, a closure having spaced portions respectively closing said open ends against communication with each other, means including a port establishing communication between the opposite ends of the pressure cylinder and reserve chamber, valve means for differentially controlling the flow of fluid through said port in opposite directions, said valve means comprising a member supported for sliding movement and having a portion engageable with a seat surrounding the port to close the latter, yieldable means normally urging said member to a position wherein said port is closed thereby, and a restricted passage through said valve member forming a bleed between the pressure cylinder and reserve chamber.

10. In a direct acting shock absorber, a pressure cylinder and a reserve chamber cast in one piece with the reserve chamber extending in the direction of length of the pressure cylinder at one side of the latter, one end of the pressure cylinder being opened and the adjacent end of the reserve chamber also being opened, said pressure cylinder and reserve chamber comprising a casing having an open end extending beyond the open ends of the pressure cylinder and reserve chamber and disposed concentric with the pressure cylinder, a closure having axially spaced portions respectively closing the open ends of the casing and cylinder, and a piston assembly reciprocably mounted in the pressure cylinder and having a connecting rod extending through said closure.

11. In a direct acting shock absorber, a pressure cylinder and a reserve chamber cast in one piece with the reserve chamber extending in the direction of length of the pressure cylinder at one side of the latter, one end of the pressure cylinder and the adjacent end of the reserve chamber being open, said pressure cylinder and reserve chamber comprising a casing having an open end extending beyond the open ends of the pressure cylinder and reserve chamber and disposed concentric with the pressure cylinder, a closure having a portion threadedly engaging the open end of the casing and having another portion extending into the open end of the pressure cylinder for closing the latter end, and a piston assembly reciprocably mounted in the pressure cylinder and having a connecting rod extending through said closure.

JOHN M. NICKELSEN.